US008645928B2

(12) United States Patent
Chu et al.

(10) Patent No.: US 8,645,928 B2
(45) Date of Patent: Feb. 4, 2014

(54) LOCALIZING A JAVA GUI APPLICATION WITHOUT SOURCE CODE MODIFICATION AND REBUILDING

(75) Inventors: Heng Chu, Chapel Hill, NC (US); Ling Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1742 days.

(21) Appl. No.: 11/424,835

(22) Filed: Jun. 16, 2006

(65) Prior Publication Data
US 2006/0294463 A1    Dec. 28, 2006

(30) Foreign Application Priority Data

Jun. 24, 2005  (CN) .......................... 2005 1 0080938

(51) Int. Cl.
*G06F 9/45*  (2006.01)
*G06F 17/20*  (2006.01)
*G06F 3/00*  (2006.01)

(52) U.S. Cl.
USPC ............................... 717/136; 704/8; 715/703

(58) Field of Classification Search
None
See application file for complete search history.

(56) References Cited

U.S. PATENT DOCUMENTS

| | | | | |
|---|---|---|---|---|
| 5,583,761 | A * | 12/1996 | Chou ............................ | 715/201 |
| 5,953,524 | A * | 9/1999 | Meng et al. .................... | 717/108 |
| 6,151,022 | A | 11/2000 | Alshibani et al. | |
| 6,275,790 | B1 * | 8/2001 | Yamamoto et al. .............. | 704/8 |
| 6,311,151 | B1 * | 10/2001 | Yamamoto et al. .............. | 704/8 |
| 6,567,973 | B1 * | 5/2003 | Yamamoto et al. ........... | 717/136 |
| 6,735,759 | B1 | 5/2004 | Yamamoto et al. | |
| 6,802,055 | B2 * | 10/2004 | Jade et al. ...................... | 717/130 |
| 7,024,365 | B1 * | 4/2006 | Koff et al. ................... | 704/270.1 |
| 7,152,222 | B2 * | 12/2006 | Kumhyr et al. ............... | 717/107 |
| 7,814,415 | B2 * | 10/2010 | Cox .............................. | 715/249 |
| 2003/0001854 | A1 * | 1/2003 | Jade et al. ..................... | 345/581 |
| 2003/0041319 | A1 | 2/2003 | Sokolov | |
| 2003/0131320 | A1 * | 7/2003 | Kumhyr et al. ............... | 715/536 |
| 2003/0149960 | A1 * | 8/2003 | Inamdar ........................ | 717/118 |
| 2003/0171911 | A1 * | 9/2003 | Fairweather ..................... | 704/2 |
| 2004/0133855 | A1 * | 7/2004 | Blair et al. .................... | 715/517 |
| 2004/0268311 | A1 | 12/2004 | Pizzoli et al. | |

FOREIGN PATENT DOCUMENTS

CN    1547116 A    11/2004

OTHER PUBLICATIONS

He, Z., et al., "Software Internationalisation and Localisation: Practice and Evolution", Proceedings of the Inaugural Conference on the Principles and Proactice of Programming [online], 2002 [retrieved May 7, 2012], Retrieved from Internet: <http://dl.acm.org/citation.cfm?id=638494>, pp. 89-94.*

(Continued)

*Primary Examiner* — Isaac Tecklu
*Assistant Examiner* — Todd Aguilera
(74) *Attorney, Agent, or Firm* — Patterson & Sheridan, LLP

(57) ABSTRACT

A method, computer system and computer program product localize a source language user interface of software application to a target language user interface. While the software application is executing using the source language user interface, source language GUI component text of a GUI component is extracted from bytecode of the software application. The extracted source language GUI component text is formed into a localization pack file. The source language GUI component text of the localization pack file is translated to the target language. In response to the software application executing again, the translated GUI component text is loaded from the translated localization pack file. The GUI component is displayed with the translated GUI component text.

17 Claims, 8 Drawing Sheets

(56) References Cited

OTHER PUBLICATIONS

Piroumian, V., "Internationalization Support in Java", IEEE Micro [online], vol. 17 No. 3, 1997 [retrieved May 7, 2013], Retrieved from Internet <http://ieeexplore.ieee.org/stamp/stamp.jsp?tp=&arnumber=591651>, pp. 20-29.*

Xiao Hui Zhu, Ming Zhu Cui, Bei Shu, Yi Zhen Xu, Xia Li, Ming Li, Fei Qu, "e-business Globalization Solution Design Guide, Getting Started" [online] Dec. 2002 [Retrieved on May 24, 2006] Retrieved from the Internet: <URL: http://www.redbooks.ibm.com/redbooks/pdfs/sg246851.pdf>, pp. i-xiv, 1-190.

* cited by examiner

LOCALIZING A JAVA GUI APPLICATION WITHOUT SOURCE CODE MODIFICATION AND REBUILDING

CROSS-REFERENCE TO RELATED APPLICATIONS

This patent application claims benefit under 35 USC §119 to Application No. 200510080938, filed in the China Patent Office on Jun. 24, 2005 by Heng Chu and Ling Zhang, assigned to International Business Machines Corporation, titled "System and Method for Localizing JAVA GUI Application without Source Code Modification and Rebuilding" which is hereby incorporated herein by reference in its entirety.

BACKGROUND OF THE INVENTION 1.0 Field of the Invention

The present invention relates to a localizing a Graphical User Interface (GUI), and more particularly, to localizing a Java GUI application without modifying and rebuilding the source code.

2.0 Description of the Related Art

A Java® GUI application uses graphical components as the GUI to interact with a user. Java GUI components comprise button, menu, text field, check box, drop-down list and other commonly used visual controls. The "Abstract Window Toolkit" (AWT) and Swing are two commonly used Java GUI frameworks which include the above GUI components and enable the developer to write applications by placing the GUI components on a window panel.

Many Java GUI applications only support English as the language of the user interface. Those applications are difficult to use for customers in non-English countries or regions, and for those customers who want to read the text on the window in their own native language rather than English. One possible solution, referred to as a legacy localization process, is to re-write the Java GUI application, extract all language related strings to a separate localization pack, translate the localization pack, and then display the translated text on the user interface window using such processes as rebuilding and re-compiling. The legacy localization process works but is expensive because the Java source code of the Java GUI application is modified and the entire application is recompiled. In addition, for some legacy Java GUI applications, localization is not taken into account when the Java GUI applications are developed, and the source code may not even be available therefore making it impossible to perform the legacy localization process. Therefore, there is a need for a technique to localize a Java GUI application without modifying the source code.

SUMMARY OF THE INVENTION

The present invention provides a system, method and computer program product to localize a Java GUI application without knowing the source code and transparently localizes the Java GUI application using a Java bytecode instrumentation tool and user interface (UI) rendering function capture and enhancement. A Java GUI application that is localized can display the UI in any language and the output text can be modified to another language at any time.

Various embodiments of a computer-implemented method, system and computer program product localize a source language user interface of software application to a target language user interface. In some embodiments, while the software application is executing using the source language user interface, source language GUI component text of a GUI component is extracted from bytecode of the software application. The extracted source language GUI component text is formed into a localization pack file. The source language GUI component text of the localization pack file is translated to the target language. In response to the software application executing again, the translated GUI component text is loaded from the translated localization pack file. The GUI component is displayed with the translated GUI component text.

In some embodiments, a computer system localizes a source language user interface of a software application to a target language user interface. The computer system comprises a processes and a memory that is coupled to the processor. The memory stores one or more instructions that extract source language GUI component text of one or more GUI components from bytecode of the software application while the software application is being executed using the source language user interface. The memory stores a localization pack file comprising the source language GUI component text and a translation of the source language GUI component text to the target language. The memory stores one or more instructions that load the translation from the localization pack file, wherein the one or more GUI components are displayed with the translation.

According to one aspect of the present invention, a method of localizing a source language user interface of a software application into a target language user interface is provided. The method comprises: when the software application executes using a source language user interface, extracting source language GUI component text from bytecode of the software application, forming the source language GUI component text into a localization pack file, translating the source language GUI component text in the localization pack file to the target language, when the software application executes again, loading the translated GUI component text from the localization pack file, and displaying the translated GUI component text.

According to another aspect of the present invention, a system for localizing a source language user interface of a software application into a target language user interface is provided. The system comprises: an extracting means for, when the software application executes using the source language user interface, extracting source language GUI component text from bytecode of the software application, a localization pack file for storing the extracted source language GUI component text and for use in translating the source language GUI component text to the target language GUI component, and a loading means for, when the software application executes again, loading the translated GUI component text from the translated localization pack file, so as to display the GUI component with the translated GUI component text in the target language on a screen.

In various embodiments, the present invention captures a corresponding function call, for example, setXXX(string) or constructor, while the software application is executing, extracts the text therein and saves the extracted text to a localization pack file. Subsequently, after the localization pack file is translated from the source language to the target language, the software application loads the translated text from the localization pack file the next time the application is executed and displays the translated text on the window. In some embodiments, this method removes all UI related strings to a separate file and reads a translated NLS (National Language Support) string for display in an automatic and transparent way.

According to the preferred embodiments of the present invention, a dynamic string and a dynamically loaded string can be translated.

Using the present invention, it is convenient for users to use a Java GUI application which is not compiled in their native language. If the application is not localized prior to being distributed or if it is not at all possible to localize the application prior to being distributed, users can extract and translate the GUI component of the application on their own and can subsequently use the application with a translated user interface component.

Therefore, using the present invention, the expensive legacy localization process can be substantially replaced.

BRIEF DESCRIPTION OF THE DRAWINGS

The above advantages and other advantages and features of the present invention can be readily understood by considering the following description in conjunction with the accompanying drawings, in which.

DETAILED DESCRIPTION

After considering the following description, those skilled in the art will clearly realize that the teachings of the various embodiments of the present invention can be utilized to localize a source language user interface of a software application to a target language user interface. Various embodiments of a method, system and computer program product localize a source language user interface of software application to a target language user interface. While the software application is executing using the source language user interface, source language GUI component text of a GUI component is extracted from bytecode of the software application. The extracted source language GUI component text is formed into a localization pack file. The source language GUI component text of the localization pack file is translated to the target language. In response to the software application executing again, the translated GUI component text is loaded from the translated localization pack file. The GUI component is displayed with the translated GUI component text.

The preferred embodiments of the present invention will be explained in detail with reference to the accompanying drawings.

Various embodiments of the present invention will be described by way of example in which a Java GUI application uses English as the source language and simplified Chinese as the target language. However, it will be understood that the present invention allows a user to localize the user interface component without knowing the source code, and is applicable to other languages as the source and target languages.

Figure 1:
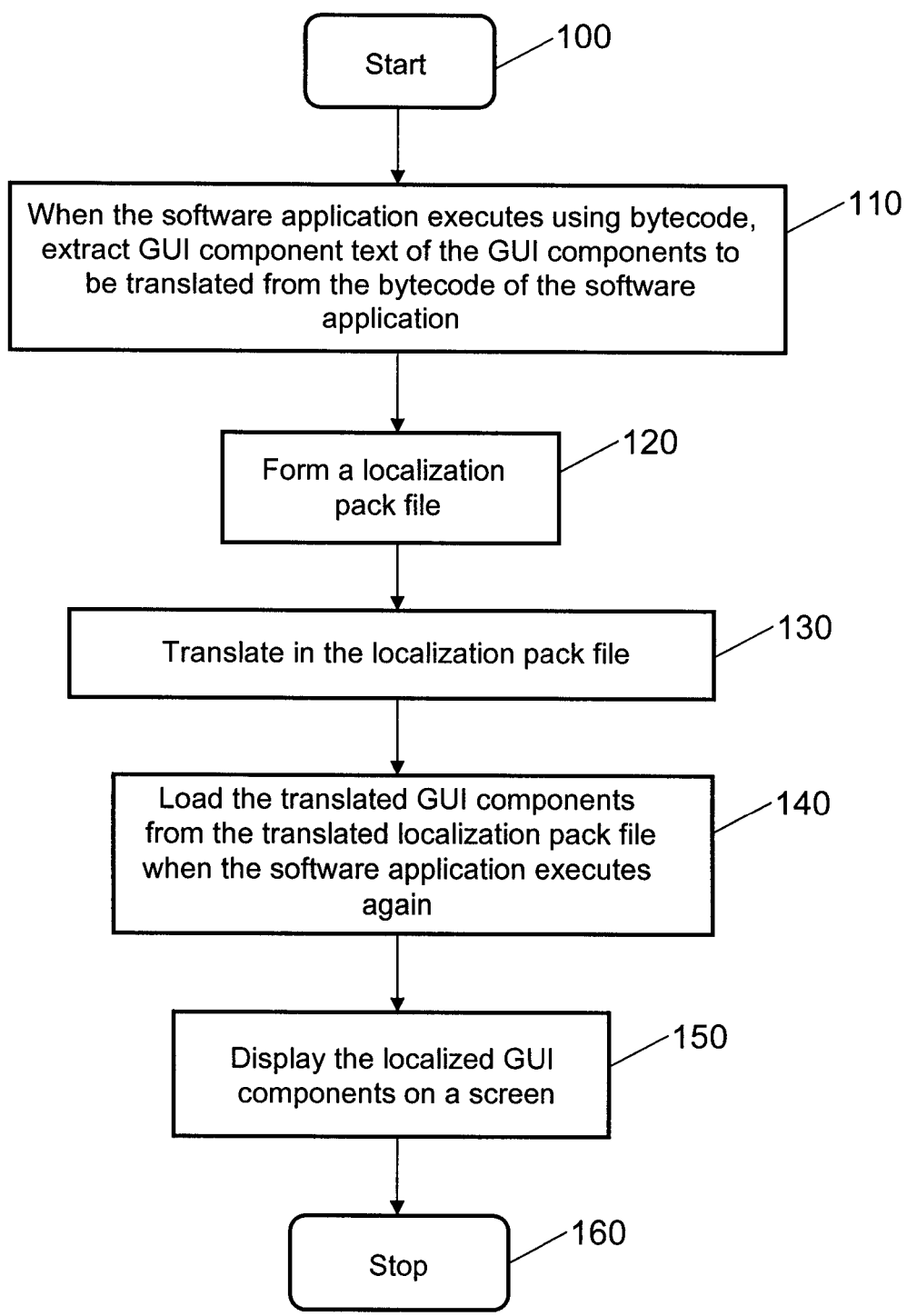
FIG. 1 is a flowchart of a method in accordance with an embodiment of the present invention.

Referring to FIG. 1, a flowchart according to an embodiment of the method of the present invention is depicted. In FIG. 1, it is assumed that the software application user interface uses English as the source language, and that users who take Chinese as their native language preferably desire that the English language user interface be translated into Chinese for ease of use.

The method according to the present invention begins with step 100 and proceeds to step 110. In step 110, when the software application having an English language user interface executes using bytecode, the GUI component text of the GUI components to be translated are extracted from the bytecode of the software application one-by-one at execution time. After all the localizable GUI component texts are extracted, in step 120, these GUI components are formed into a localization pack file. The localization pack file can be stored in a user's computer or in other appropriate locations. In step 130, the user translates all the user interface GUI component texts in the localization pack file to Chinese. In step 140, when the software application executes again, the translated GUI component text of the translated GUI components is loaded from the translated localization pack file. In addition, in step 150, the localized GUI components are displayed on a screen in Chinese. In step 160, the method of the present invention ends.

The following is a detailed explanation of the technology associated with the method of FIG. 1.

First, as is known to those skilled in the art, to display non-editable text on a displaying window, developers use a GUI component such as AWT Label or Swing JLabel, and call setXXX(string), for example, setText(string), or constructors thereof, such as new JLabel(string), for the purpose of display. The Java classes of all the GUI components that are used for compiling the user interface use constructors or setXXX (string) to display messages on the user interface. Exemplary Java classes comprise TextField, JTextField, Button, JButton, Menu, JMenu, MenuItem, JMenuItem, etc.

The above-mentioned setXXX(string) represents the text to be displayed on the user interface, and is setText(string) in most cases. For example, "setText("OK")" may set the text on a typical "OK" button. A constructor represents a program called during the initialization of the classes, and the constructor can be used to define, for example, the size, position or the like of the GUI component. SetXXX(string) and the constructor can be called a "method" or regarded as a function call.

Therefore, in step 110 of FIG. 1, the GUI component is extracted by searching the Java bytecode for constructors or setXXX(string).

Next, the so-called "bytecode" is computer program code generated by a compiler when the initial source code is processed. Using a bytecode instrumentation tool, instructions can be inserted in the bytecode so as to extract information while the software program is executing.

Java bytecode instrumentation is basic to Java-based aspect-oriented programming. A Java bytecode instrumentation tool enables the user to insert instructions at any position in the bytecode so that information can be extracted during execution of the software program. The Java bytecode instrumentation tool loads bytecode statically (loaded as object) or dynamically (loaded by customized classloaders) and can instrument the bytecode based on the Java Virtual Machine (JVM) specification. Javaassist and Apache Byte Code Engineering Library (BCEL) are two open source code Java bytecode instrumentation tools that are commonly used at present. However, the present invention is not meant to be limited to Javaassist and Apache BCEL, and can be used with other Java bytecode instrumentation tools.

A class-method mapping table is used in the process of extracting the GUI component to be localized in step 110 of FIG. 1. The class-method mapping table stores the mapping of a class and its text display method. For example, for the JLabel class, the text display method thereof is setText(string) or new JLabel(string). To display text for MenuItem, setLabel (string) is used. The class-method mapping table may take the following forms:

JLabel=setText
JLabel=JLabel
JButton=setText
JButton=JButton
...

For "JLabel=JLabel" on the second line of the above class-method mapping table, the "JLabel" to the right of the equal sign represents the constructor and has the same name as the class.

The class-method mapping table provides a list of classes and methods to be localized and is used for determination during bytecode instrumentation. In this class-method mapping table, only the listed classes and methods will be localized.

In addition, some Java classes may extend the basic AWT/Swing widgets and their class name may not be known, therefore these class names will not be included in the class-method mapping table. In this case, the to-be-localized method call can be found by searching the super-class thereof, and the super-class can finally be linked to the base class of AWT/Swing widgets. Since the particular technique to link a super-class to its base class is not relevant to the present invention, the linking of a super-class to its base class will not be described in detail.

In sum, using the bytecode instrumentation tool, the method of the present invention can insert specific instructions before and after the setXXX(string) method of a particular class so as to intercept and extract the setXXX(string) method. The inserted instructions first capture the text string that will be displayed by the setXXX(string) method and save that text string to a localization pack file. When all the localizable methods are captured and extracted, all translatable strings in the original software application will be stored into the localization pack file in <key=value> form. The "key" is the identifier of the method. The method can be uniquely identified using the class name of the method, the string display position, the method name and the method position or the like. The "value" is the extracted source language text, for example, English text. After storing the translatable strings in the localization pack file, the user can translate the localization pack file to any target language.

Therefore, when the software application executes again, the inserted instructions will determine whether the captured text is in the localization pack file. If so, the inserted instructions will replace the captured text with the localized GUI component, so that the language pack of the translated GUI component can be displayed on the screen.

The localized Java GUI application may comprise the following three parts: an enhanced Java Archive (JAR) package, a localization pack manager and a localization pack.

The enhanced JAR package stores the Java code(s) of the localized Java GUI application and contains a series of related classes and interfaces. The localization pack manager is used to write the extracted text into the localization pack file located in a user computer system and to search the localization pack file for the translated text for display. The localization pack stores the localized user interface component of the Java GUI application.

The localization pack manager can be implemented using the Java bytecode instrumentation tool. When the GUI component to be localized is found in the Java bytecode, the Java bytecode instrumentation tool can be used to insert instructions before the function call of the GUI component to capture the text string of the function call and save that captured text string in the localization pack file. After localization, the localization pack manager is added to the class in the classpath of the original Java GUI application, so that the original Java GUI application can know the location where to call the localization pack file to use the translated GUI component. The localization pack manager can be regarded as a set of all the instrumentation instructions. In various embodiments, the localization pack manager is also the only class that is added to the classpath of the original Java GUI application.

Figure 2:
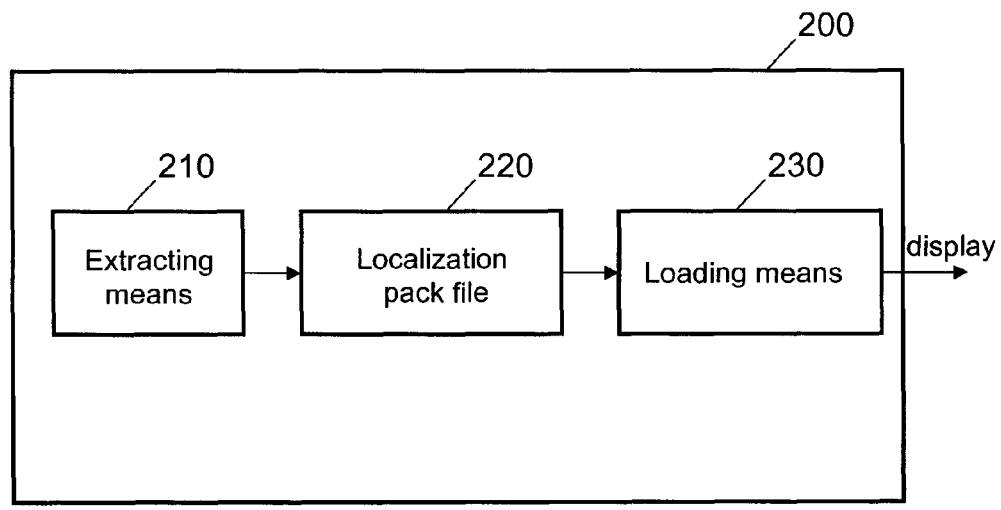
FIG. 2 is a block diagram of a system in accordance with an embodiment of the present invention.

FIG. 2 depicts a block diagram of an embodiment of the system 200 of the present invention. The system 200 according to the present invention comprises an extracting means 210 for, when the software application using an English user interface executes, extracting the GUI component text from the bytecode of the software application. The system 200 further comprises a localization pack file 220 located in the user computer or any other appropriate location. The localization pack file 200 is used for storing the text of each GUI component that is extracted by the extracting means 210 and for the user to translate each user interface component text therein to Chinese. The system 200 according to the present invention further comprises a loading means 230 for, when the user executes the software application again, loading the translated GUI component text from the translated localization pack file 220, so that the translated GUI component is displayed on the screen.

Figure 3:
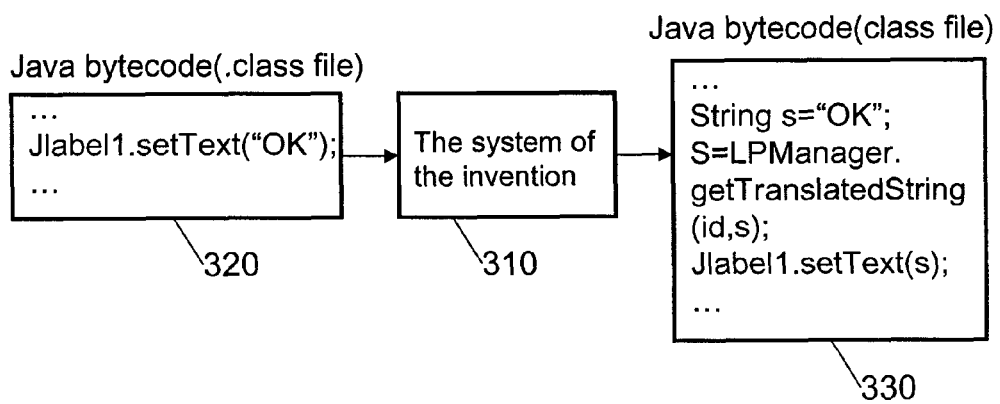
FIG. 3 is a schematic diagram illustrating modifications to the bytecode of a software application using an embodiment of the present invention.

FIG. 3 schematically illustrates modifications of the bytecode of the software application after passing through the system of the present invention. The block associated with reference numeral 310 represents an embodiment of the system of the present invention. Block 320 to the left of block 310 represents the bytecode to be passed through the system of the present invention 310, and block 330 to the right of block 310 represents the bytecode after passing through the system of the present invention 310.

Figure 4:
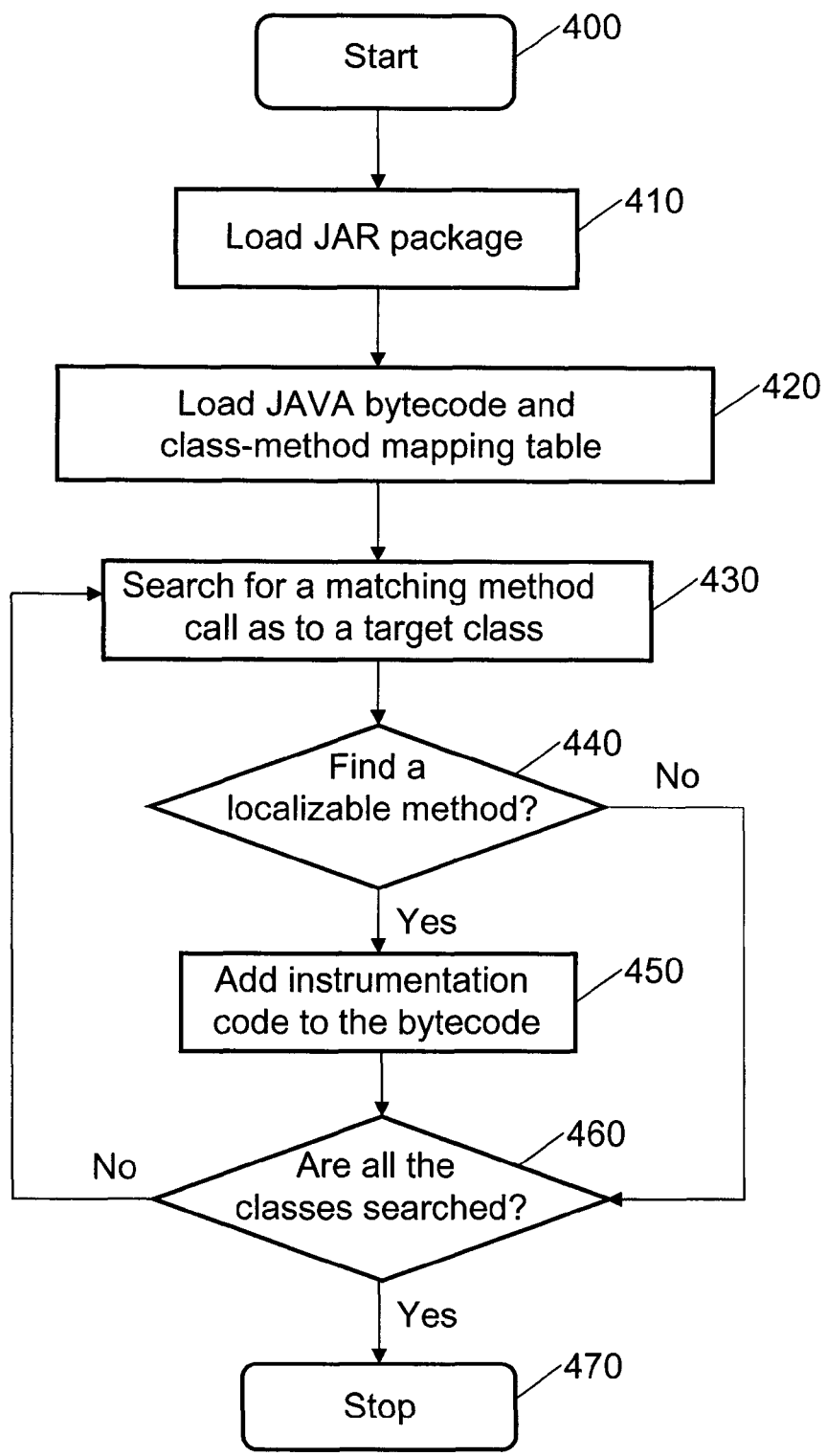
FIG. 4 depicts a specific example of the extracting step of FIG. 1.

Referring to FIG. 4, the extracting step 110 of the method of FIG. 1 will be described in further detail. The extracting step is also referred to as an extracting process. In step 400, the extracting process begins and then proceeds to step 410. In step 410, the JAR package of the original Java GUI application is loaded. Next, in step 420, the Java bytecode and the class-method mapping table are loaded from the JAR package. In step 430, the extracting process searches for a matching method call as to a target class. If, in step 440, a localizable method is found ("Yes" branch), the extracting process proceeds to step 450. In step 450, the extracting process adds instrumentation instructions to the bytecode so as to intercept the localizable method. Subsequently, in step 460, the extracting process determines whether all of the classes are searched. If so, in step 470, the extracting process ends. If not, then the extracting process returns to step 430 and to search for the matching method call for other classes.

On the other hand, if in step 440, the extracting process does not find a localizable method matching a certain class ("No" branch), the extracting process according to the present invention proceeds directly to step 460 to determine whether to repeat the foregoing operation on the remaining classes.

After the above operation is performed as to all the classes, in step 470, the extracting process ends.

Figure 5:
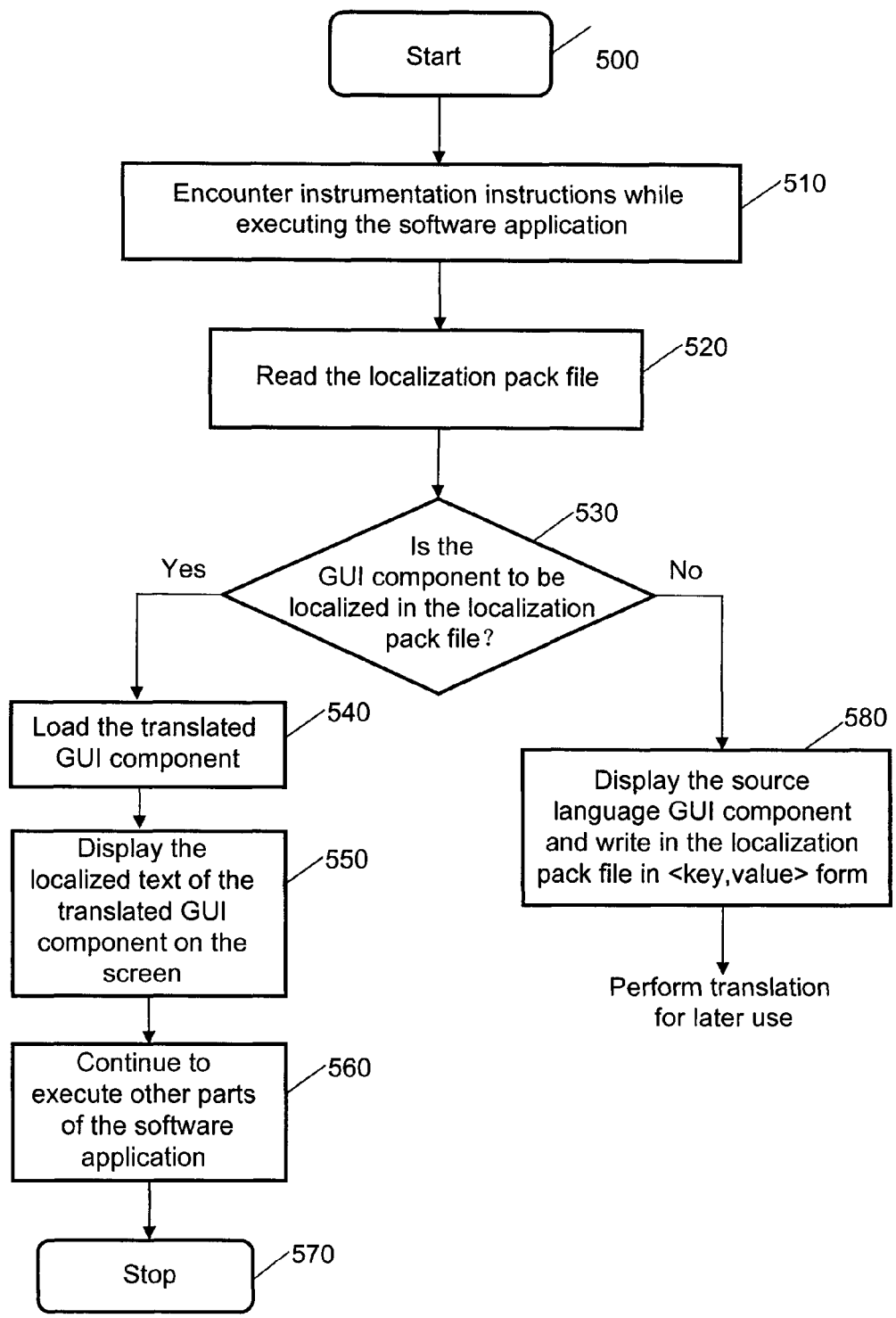
FIG. 5 depicts a specific example of the loading step of FIG. 1.

Referring to FIG. 5, the loading step 140 of the method of FIG. 1 will now be described in further detail. The loading step 140 (FIG. 1) is also referred to as a loading process. In step 500, the loading process begins and then proceeds to step 510. In step 510, the inserted instrumentation instructions are encountered while executing the software application, which means there is a GUI component to be displayed. Thus, in step 520, the instrumentation instructions cause the localization pack file that is stored, for example, in the user computer, to be read. Step 530 determines whether the GUI component to be localized is in the localization pack file. If so, ("Yes" branch), namely that step 530 determines that the localization pack file has the translation of the GUI component, the loading process proceeds to step 540 and in step 540 loads the translated GUI component. In step 550, the localized text of the translated GUI component is displayed on the screen. After step 550, in step 560, other parts of the software application continue to be executed. In step 570, the loading process ends.

However, if step 530 determines that the localization pack file does not have the translation of the GUI component, then the loading process proceeds to step 580. In various embodiments, the GUI component using the source language, for example, English, is displayed on the screen. In some embodiments, the GUI component is stored into the localization pack file in <key=value> form for subsequent translation.

If a certain GUI component only appears in rare cases, the "No" branch of step 530 may occur. When the "No" branch occurs, in step 580, the GUI component can be extracted and its translation can be added to the localization pack file.

It can be seen that, when localizing the user interface according to the method and system of the present invention, the user interface component translation may be performed more than once. As a new GUI component occurs, the translation files can continue to be supplemented and improved.

In addition, we may find that during operation of a computer, some GUI components of the user interface are dynamic and may vary with the differences of the operating environment, system status or the like of the software application. This dynamic GUI component is called a dynamic string. Usually, a dynamic sting is a string which is a concatenation of a plurality of sub-strings, wherein some of the sub-strings are static while the others are dynamic.

For example, when performing a disk collating operation in the Windows XP operating system, the following dynamic string may appear:

"disk collating " can be used to release 2,374,781 KB of disk space on (C:)

In the above string, the sub-strings ""disk collating" can be used to release" and "KB of disk space on " are static, while the sub-strings "2,374,781" and "(C:)" are dynamic and can vary with the different operating state and status of the system.

It can be understood that, if a dynamic string is unchangeably extracted and translated by the approach of the invention, then when the computer system executes again and the status and operating state thereof change, if the translation in the localization pack file is always the translation corresponding to the above particular string, it may not reflect the actual state of the computer system. As to this circumstance, the present invention sets forth the method of FIG. 6

Figure 6:
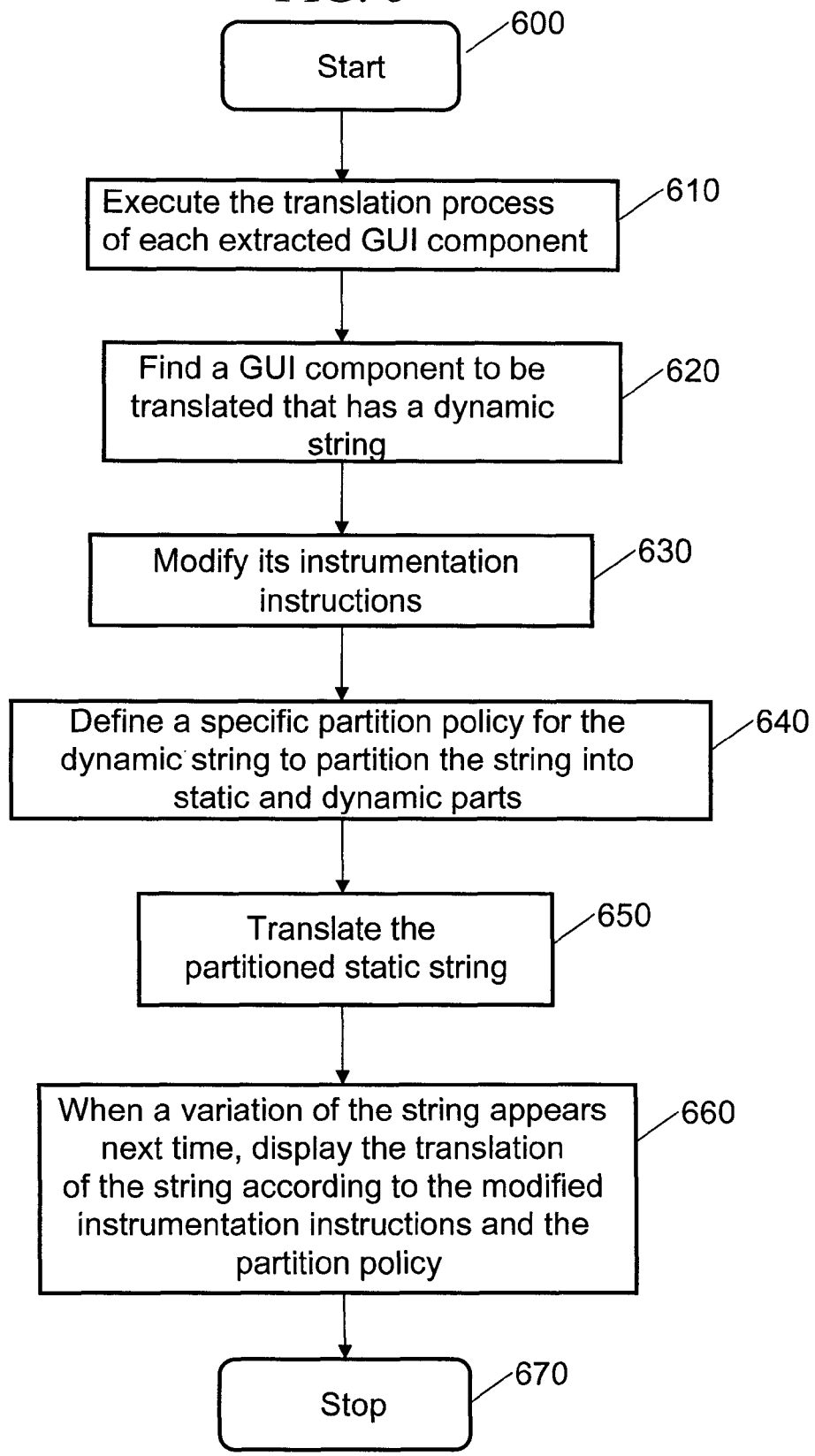
FIG. 6 is a flowchart illustrating the processing of a dynamic string.

Referring to FIG. 6, a schematic flowchart illustrates the processing of a dynamic string. The method o the present invention of FIG. 6 begins in step 600 and processed to step 610. Step 610 executes the translation process of each extracted GUI component. In step 620, the translator finds a certain GUI component to be translate that has a dynamic string. In step 630, the instrumentation instructions are modified. In step 640, the translator defines a specific partition policy for the dynamic string to partition the string into static and dynamic parts. In step 650, the static part of the string is translated. Subsequently, in step 660, when the system executes again and encounters a certain variation of the dynamic string, the system can determine the translation in accordance with the partition policy previous defined by the translator, for example, by comparing the dynamic string with the previously extracted string for display to the user. That is, in step 660, when a variation of the string is encountered next time, the translation of the string is displayed according to the modified instrumentation instructions and the partition policy. In step 670, the method of the present invention of FIG. 6 ends.

It should be understood that, for a dynamic string, the relationship between the combination of the constituent parts, that is, the partition policy for the dynamic string, will not change, and what changes is the specific content in each part.

In addition, as the functions of the computer system continue to evolve, the operation of the computer system involves ever-increasing interactions with external programs or systems. Therefore, some applications dynamically load the GUI from external classes, such as an Eclipse plug-in that contains a GUI-based editor. Since various embodiments of the foregoing system and method of the present invention localize Java applications before they execute, unknown Java classes, either downloaded from network or other file systems may not be localized. In order to solve this problem, various embodiments of the present invention provide an approach to directly translate a dynamic string in the user interface. This approach can be realized by the method shown in FIG. 7.

Figure 7:
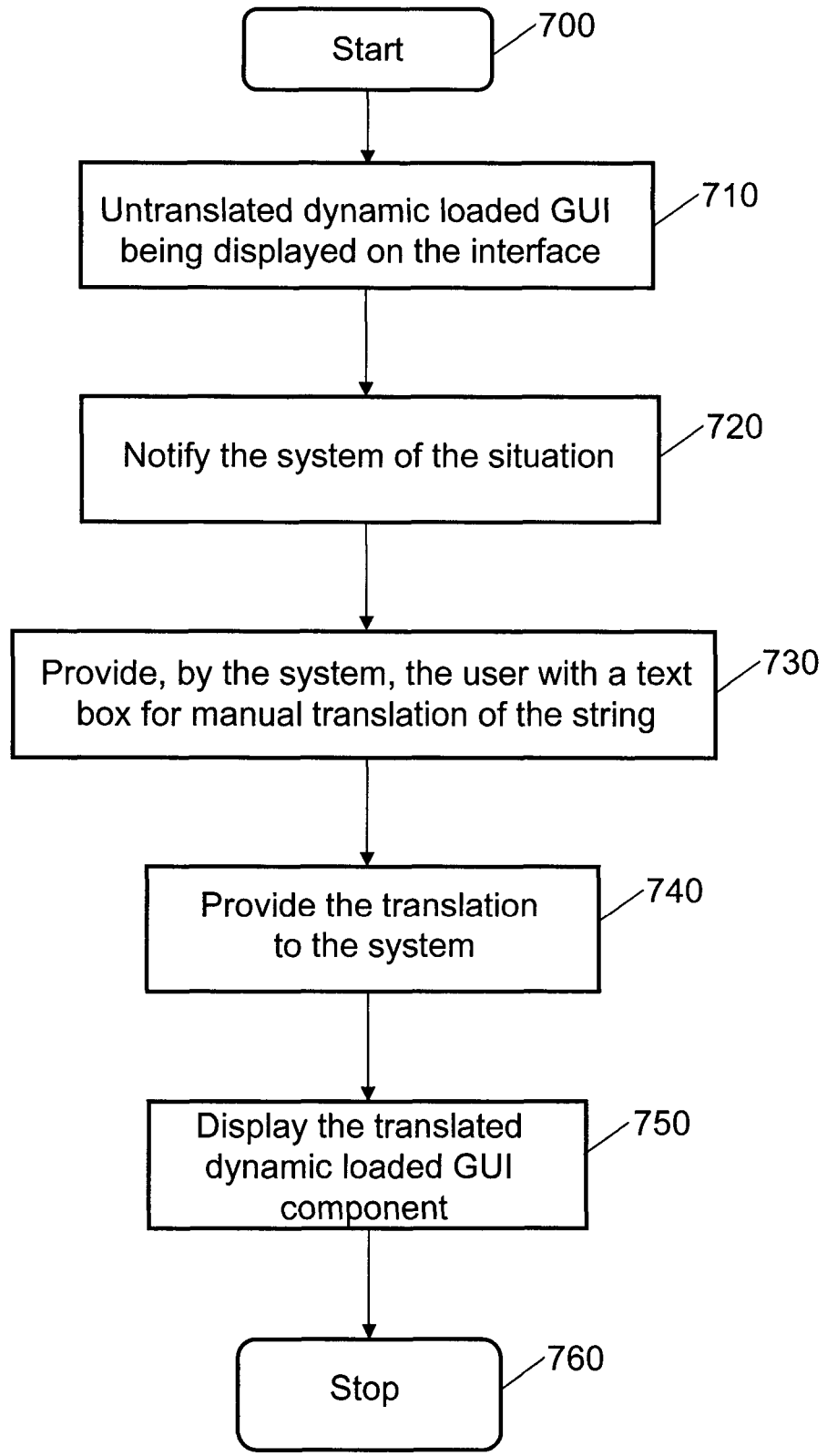
FIG. 7 is a flowchart illustrating the processing of a dynamically loaded GUI component.

FIG. 7 is a schematic flowchart illustrating the processing of a dynamically loaded GUI component. As to the dynamically loaded GUI, the system according to an embodiment of the present invention may add a special event handler to receive from the user a notification that the display content of an interface is a dynamically loaded GUI component. This event handler can be implemented as a button on the screen, and in response to the user activating the button, the event handler is executed to allow the user to directly translate the GUI component.

This method begins with step 700 and proceeds to step 710. In step 710, the non-translated dynamic loaded GUI components are displayed on the user interface. Thus, in step 720, the user will notify the system of this situation, for example, as described above by activating the special button on the screen. In step 730, in response to the notification, the system provides the user with a means for translating the string, for example, a pop-up textbox. Subsequently, in step 740, the user provides the translation to the system. In step 750, the system stores the translation and displays the translated dynamic loaded GUI component. In step 760, the method according to the present invention of FIG. 7 ends.

The system according to the present invention can store the translation of the dynamically loaded GUI component with the static strings, so that upon encountering the dynamically loaded GUI component again, the system will not provide the user with the textbox in which the user performs a manual translation, but directly displays the translated dynamically loaded GUI component to the user.

In addition, the manual translation of FIG. 7 is also suitable for translation of the aforesaid dynamic string.

The following describes the structure of the system corresponding to the process of the method according to various embodiments of the present invention.

Figure 8:
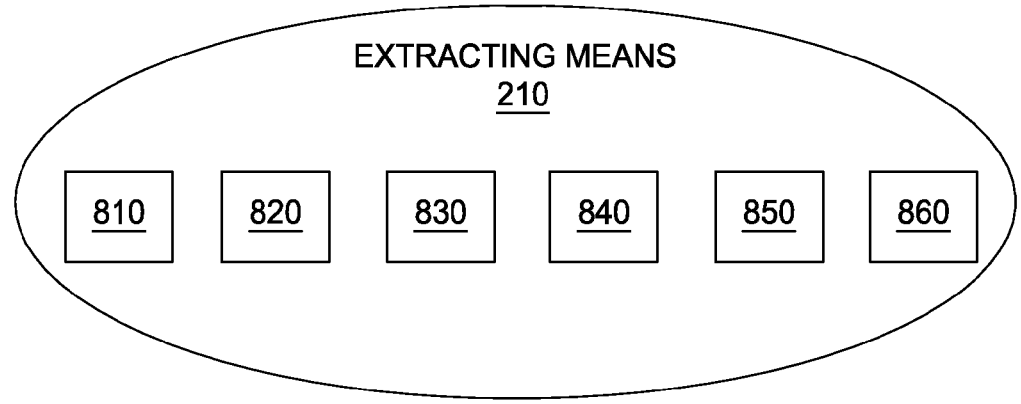
FIG. 8 depicts an embodiment of the extracting means of FIG. 2.

FIG. 8 depicts an embodiment of the extracting means 210 of FIG. 2. The extracting means 210 (FIG. 2) further comprises a means 810 for loading Java bytecode and a class-method mapping table from the JAR package, a means 820 for searching the class-method mapping table for the matching method call for each class, a means 830 for, in the case where the matching method call is found, adding instrumentation instructions to the bytecode of the method call, and a means 840 for determining whether each class is searched for the matching method call.

Moreover, when the Java classes have extended the basic GUI components and their class names are not known, the extracting means 210 (FIG. 2) further comprises: a means 850 for finding the to-be-localized method call of the basic GUI component by searching the super-class thereof, and a means 860 for associating the super-class with the base class of the GUI widgets.

Figure 9:
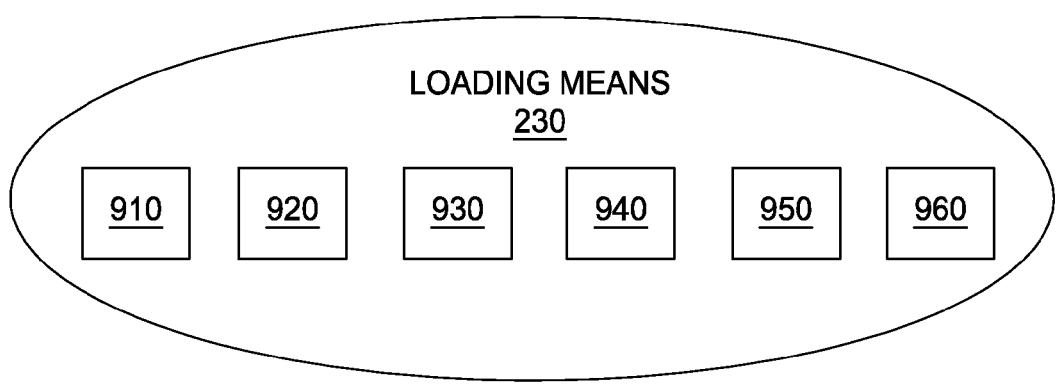
FIG. 9 depicts an embodiment of the loading means of FIG. 2.

FIG. 9 depicts an embodiment of the loading means 230 of FIG. 2. The loading means 230 (FIG. 2) further comprises: a means 910 for, when software applications execute, reading the localization pack file stored in the user computer, upon encountering the inserted instrumentation instructions, a means 920 for determining whether the GUI component to be displayed is in the localization pack file, a means 930 for, when the GUI component to be displayed is determined to be in the localization pack file, loading the translated GUI component, and a means 940 for displaying the translated GUI component on the screen.

In addition, when the means for determining determines that the GUI component to be displayed is not in the localization pack file, the loading means 230 (FIG. 2) further comprises: a means 950 for displaying the source language GUI component on the screen, and a means 960 for extracting the GUI component to the localization pack file for performing translation.

Figure 10:
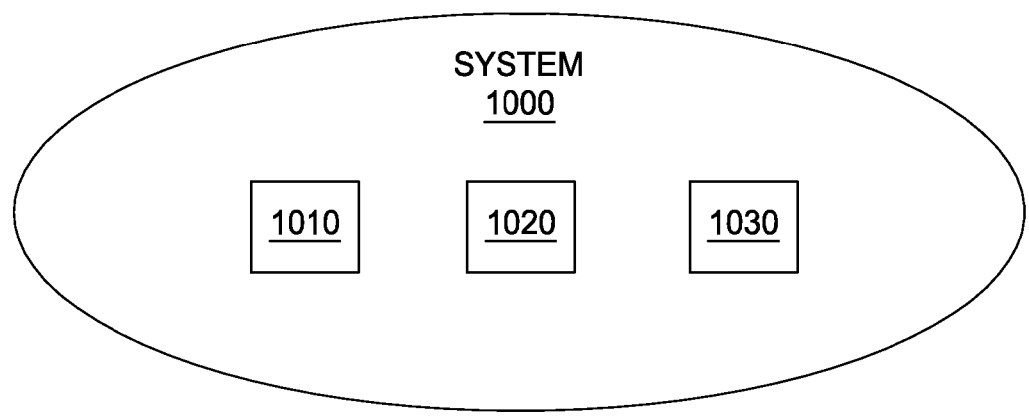
FIG. 10 depicts another embodiment of the system according to the present invention when a dynamic string is processed.

FIG. 10 depicts another embodiment of the system according to the present invention when a dynamic string is processed. If a GUI component to be translated, which is extracted by the extracting means 210 (FIG. 2), comprises a dynamic string, the system 1000 according to the present invention further comprises a means 1010 for, according to the predefined partition policy, partitioning the dynamic string into dynamic and static parts, and a means 1020 for, after the static parts of the dynamic string are translated, storing the translation. When the system executes again and encounters a variation of the dynamic string, the load means 230 (FIG. 2) comprises means 1030 for determining the translation of the string according to the predefined partition rule and displaying the translation to the user.

Figure 11:
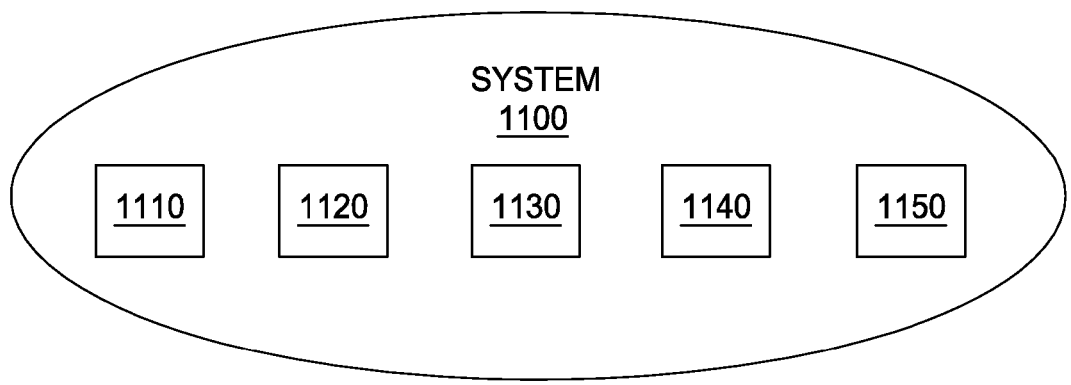
FIG. 11 depicts another embodiment of the system according to the present invention when a dynamic string or a dynamically loaded string is processed.

FIG. 11 depicts another embodiment of the system according to the present invention when a dynamic string or a dynamically loading string is processed. At this time, the system 1100 according to the present invention has a means 1110 for defining an event handler for the dynamic string or dynamically loaded string to receive from the user the notification about the dynamic string or dynamically loaded string, a means 1120 for, in response to the notification received from the user, providing the user with a text input approach to allow the user to manually translate the dynamic string or dynamically loaded string, a means 1130 for storing the translation performed by the user, and a means 1140 for displaying the translated dynamically loaded GUI component on the screen.

Further, the system according to the present invention as shown in FIG. 11 further comprises a means 1150 for, when the system has stored the translation of a dynamic string or a dynamically loaded string, directly displaying the translation on the user interface and disabling the means for performing manual translation.

The various means according to the present invention can be implemented using software, a discrete hardware elements or a combination thereof. In a preferred embodiment, the invention may be a memory or logic circuit that is configured using a computer program having code means for performing the corresponding functions defined herein.

The present invention has been described with respect to exemplary user interface components in the Windows® operating system. However, the present invention is not meant to be limited to user interface components in the Windows operating system, and it is equally applicable to user interface components from other resources such as other operating systems, applications, databases, and networks, as long as these resources are designed using the GUI component application of Java.

The present invention has been described using two exemplary Java GUI frameworks, AWT and Swing. However, the present invention is not meant to be limited to AWT and Swing, and it can be adapted to any Java Rich Application, the typical examples further comprising Eclipse Standard Widget Toolkit (SWT).

Additionally, since the present invention can work in any Java-based interface displaying technology, the present invention can not only process an application which solely uses a Java GUI framework, but also can process a mixed GUI environment, for example, the user interface simultaneously using AWT, Swing and SWT technologies, which uses various Java GUI frameworks.

As described above, embodiments of the present invention may be provided as methods, systems, or computer program products. Accordingly, the present invention may take the form of an entirely hardware embodiment, an entirely software embodiment, or an embodiment combining software and hardware elements. Furthermore, the present invention may be embodied in a computer program product which is embodied on one or more computer-usable storage media, which includes, but is not limited to, disk storage, CD-ROM, optical storage, and so forth, having computer-usable program code embodied therein.

The present invention has been described with reference to illustrative flowcharts and/or block diagrams of methods, apparatus (systems), and computer program products according to embodiments of the invention. It will be understood that each block of the illustrative flowcharts and/or block diagrams, and combinations of blocks in the illustrative flowcharts and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in one or more computer-readable memories, where each such memory can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto one or more computers or other programmable data processing apparatus to cause a series of operational steps to be performed on the computers or other programmable apparatus to produce, on each such device, a computer implemented process such that the instructions which execute on the device provide steps for implementing the functions specified in the flowchart and/or block diagram block or blocks.

The foregoing preferred embodiments of the present invention describe the principles of the present invention. The foregoing explanation is merely exemplary and is not meant to be understood as limiting the present invention. Based on the foregoing description, those skilled in the art will realize that various modifications or variations can be made to the present invention and that these modifications and variations are within the scope and spirit of the present invention as recited by the claims.

Trademarks

Java and all Java-based trademarks are trademarks of Sun Microsystems, Inc. in the United States, other countries, or both. Windows is a trademark of Microsoft Corporation in the United States, other countries or both.

What is claimed is:

1. A computer-implemented method, comprising:
    while a software application is executing to generate a source language user interface, extracting source language GUI component text of a GUI component that is embodied in a bytecode of said software application, said extracting including:
        identifying that a localizable method in said bytecode of said software application matches a method found in a class-method map;
        in response to the identifying, adding instructions associated with the localizable method to said bytecode; and
        extracting source language GUI component text from an input parameter of the localizable method;
    forming a localization pack file that includes said extracted source language GUI component text, wherein said localization pack file contains a plurality of key-value pairs, and wherein each key-value pair includes a value containing at least a portion of said extracted source language GUI component text and a key indicating a location of the localizable method in said bytecode of said software application from which the portion of extracted source language GUI component text was extracted;
    translating said source language GUI component text of said localization pack file to a target language;
    in response to said software application executing again, reading said translated GUI component text from said localization pack file;
    forming a GUI component that includes said translated GUI component text; and
displaying said GUI component that includes said translated GUI component text.

2. The method of claim 1, wherein said extracting further comprises:
    reading a GUI component from said bytecode, wherein the class of said GUI component is not a recognized GUI component class;
    finding a parent GUI component class of said unrecognized GUI component class, wherein the parent GUI component class is recognized;
    searching said parent GUI component class for a to-be-localized method call; and
    associating said parent GUI component class with said unrecognized GUI component class when said parent GUI component class has a to-be-localized method call.

3. The method of claim 1 wherein said reading comprises:
    while said software application is executing, encountering one or more instrumentation instructions, wherein said one or more instrumentation instructions cause said localization pack file to be read; and
    determining whether said source language GUI component text of said GUI component to be displayed is in said localization pack file, wherein said translated GUI component text is read in response to determining that said source language GUI component text of said GUI component to be displayed is in said localization pack file.

4. The method of claim 3 further comprising:
    in response to determining that said GUI component to be displayed is not in said localization pack file, displaying said source language GUI component, and storing said source language GUI component text in said localization pack file.

5. The method of claim 1 further comprising:
    in response to encountering said GUI component, wherein said GUI component comprises a dynamic string,
    defining a partition policy for said dynamic string for use in partitioning said dynamic string into dynamic and static parts,
    translating any static parts of said dynamic string,
    determining a translation of said dynamic string in accordance with said partition policy in response to encountering a variation of said dynamic string, and displaying said translation of said dynamic string.

6. The method of claim 1 further comprising:
    defining an event handler for a particular GUI component, wherein said event handler is triggered by a user;
    in response to the triggering of the event handler, prompting said user to input a translation of particular GUI component text associated with said GUI component; and
    displaying said translation of said particular GUI component text.

7. The method of claim 6 further comprising:
    storing said translation of said particular GUI component text.

8. A computer system to localize a source language user interface of a software application to a target language user interface, comprising:
    a processor; and
    memory coupled to said processor, said memory storing:
        one or more instructions that extract source language GUI component text of one or more GUI components from bytecode of said software application while said software application is executing to generate said source language user interface, said instructions including:

one or more instructions that identify that a localizable method in said bytecode of said software application matches a method found in a class-method map;
one or more instructions that add instructions associated with the localizable method to said bytecode in response to the identifying; and
one or more instructions that extract source language GUI component text from an input parameter of the localizable method;
one or more instructions that form a localization pack file that includes said extracted source language GUI component text and a translation of said source language GUI component text to said target language, wherein said localization pack file contains a plurality of key-value pairs, and wherein each key-value pair includes a value containing at least a portion of said extracted source language GUI component text and a key indicating a location of the localizable method in said bytecode of said software application from which the portion of extracted source language GUI component text was extracted;
one or more instructions that translate said source language GUI component text of said localization pack file to a target language;
one or more instructions that, in response to said software application executing again, read said translated GUI component text;
one or more instructions that form one or more GUI components that include said translated GUI component text; and
one or more instructions that display said GUI components that include said translated GUI component text.

9. The computer system of claim 8 wherein said one or more instructions that extract further comprise:
one or more instructions that read a GUI component from said bytecode, wherein the class of said GUI component is not a recognized GUI component class;
one or more instructions that find a parent GUI component class of said unrecognized GUI component class, wherein said parent GUI component class is recognized;
one or more instructions that search said parent GUI component class for a to-be-localized method call; and
one or more instructions that associate said parent GUI component class with said unrecognized GUI component class when said parent GUI component class has a to-be-localized method call.

10. The computer system of claim 8 wherein said one or more instructions that read comprise:
one or more instructions that, while said software application is being executed, read said localization pack file in response to encountering instrumentation instructions, wherein said localization pack file is stored in said computer system, and
one or more instructions that determine whether said GUI component is in said localization pack file, wherein said translated GUI component text is read in response to said GUI component being in said localization pack file.

11. The computer system of claim 10 wherein said one or more instructions further comprise:
one or more instructions that display said source language GUI component text, and
one or more instructions that store said source language GUI component text in said localization pack file in response to said GUI component not being in said localization pack file.

12. The computer system of claim 8, said memory further comprising:
one or more instructions that, in response to encountering said GUI component, wherein said GUI component comprises a dynamic string,
partition a dynamic string of said source language GUI component text into dynamic and static parts in accordance with a predefined partition policy;
one or more instructions that store a translation of any of said static parts of said dynamic string;
one or more instructions that determine a translation of said dynamic string in accordance with said predefined partition policy; and
one or more instructions that display said translation of said dynamic string.

13. The computer system of claim 12 further comprising one or more instructions that, when said computer system stores a translation of said dynamic string, display said translation of said dynamic string.

14. The computer system of claim 8, said memory further comprising:
one or more instructions that define an event handler for a particular GUI component, wherein said event handler is triggered by a user;, and
one or more instructions that, in response to the triggering of the event handler, prompt said user to input a translation of said particular GUI component text associated with said particular GUI component.

15. The computer system of claim 8 wherein said software application is a Java Rich Application comprising at least one of: Abstract Window Toolkit, Swing and Eclipse Standard Widget Toolkit.

16. A computer program product comprising a non-transitory computer usable storage medium having a computer readable program, wherein the computer readable program when executed on a computer causes the computer to:
while a software application is executing to generate a source language user interface, extracting source language GUI component text of a GUI component that is embodied in a bytecode of said software application, said extracting including:
identifying that a localizable method in said bytecode of said software application matches a method found in a class-method map;
in response to the identifying, adding instructions associated with the localizable method to said bytecode; and
extracting source language GUI component text from an input parameter of the localizable method;
form a localization pack file that includes said extracted source language GUI component text, wherein said localization pack file contains a plurality of key-value pairs, and wherein each key-value pair includes a value containing at least a portion of said extracted source language GUI component text and a key indicating a location of the localizable method in said bytecode of said software application from which the portion of extracted source language GUI component text was extracted;
translate said source language GUI component text of said localization pack file to a target language;
in response to said software application executing again, read said translated GUI component text from said localization pack file;
form a GUI component that includes said translated GUI component text; and display said GUI component that includes said translated GUI component text.

17. The computer program product of claim 16, wherein the computer readable program is executed on the computer, said read causes the computer to:
   read the localization pack file in response to encountering one or more instrumentation instructions, wherein said one or more instrumentation instructions cause said localization pack file to be read; and
   determine whether source language GUI component text of said GUI component to be displayed is in said localization pack file, wherein said translated GUI component text is read in response to a determination that said source language GUI component text of said GUI component to be displayed is in said localization pack file.

* * * * *